July 11, 1939.　　E. W. GIFFORD　　2,165,251
SORTING MACHINE
Filed March 31, 1937　　3 Sheets-Sheet 1

INVENTOR.
Emerson W. Gifford
BY
ATTORNEY

July 11, 1939.  E. W. GIFFORD  2,165,251
SORTING MACHINE
Filed March 31, 1937  3 Sheets-Sheet 3

INVENTOR
Emerson W. Gifford
BY
ATTORNEY

Patented July 11, 1939

2,165,251

UNITED STATES PATENT OFFICE 2,165,251

SORTING MACHINE

Emerson W. Gifford, Teaneck, N. J., assignor to International Business Machines Corporation, New York, N. Y., a corporation of New York Application March 31, 1937, Serial No. 133,934

10 Claims. (Cl. 209—110)

This invention relates to improvements in machines for sorting accounting and statistical records such as the perforated record cards used in the well known Hollerith and Powers accounting machines.

A problem in sorting sometimes occurs which consists of segregating all records having predetermined classification designations from those not having the predetermined classification designations. As an example, assume a large corporation owning a chain of gasoline service stations wishes to prepare two separate statements showing on one the total annual sales of gasoline, oil, and grease and on the other the total sales of tires and storage batteries. In other words, separate statements are required for the petroleum products and accessories, respectively. Let it be assumed that each perforated record card gives the total daily sales of a given service station with respect to a single article or product and that the yearly file of record cards is arranged in main classes by states, intermediate classes by sales districts, and sub-classes by service station number. The article classification consists of a code to which the index-point positions of one column of the record card are assigned as follows:

Table I

| Class | | Product |
|---|---|---|
| 0 | Gasoline | Grade 1. |
| 1 | ___do___ | Grade 2. |
| 2 | ___do___ | Grade 3. |
| 3 | Lubricating oil | |
| 4 | Grease | |
| 5 | Kerosene | |
| 6 | Naphtha | |
| 7 | Tires and tubes | |
| 8 | Tire chains | |
| 9 | Storage batteries | |
| 11 | Miscellaneous accessories | |
| 12 | Service | |

In order to prepare the desired statements with both showing the grand totals of sales for each state, sales district and service station, it is necessary with present sorting machines to first sort the record cards into the twelve pockets of the machine in accordance with the holes in the classification column. This would break the general file into twelve groups each of which would be classified first by state, then by district, and finally by service station. In order to get two separate statements showing total sales of each group of products on a territorial basis, it is necessary to first resort the records designated 0 to 6 and then consolidate them into one batch arranged on a territorial basis and finally to similarly resort the cards designated 7, 8, 9, 11, 12.

Since this requires that all the cards of the file be passed through the sorting machine at least twice and possibly five or six times, depending on how extensive the territorial basis of classification may be, the preliminary work incidental to the preparation of the report by the tabulating machine, is lengthy and expensive.

The present invention is directed to an improvement in sorting machines for dealing with just such problems as has been outlined above and has for its general object to provide means whereby the records are distributed to the pockets in groups comprising a plurality of classifications none of which classifications need to correspond in value to the pocket receiving the group. Thus the present invention provides means whereby the records are arbitrarily grouped in separate pockets in accordance with a pre-arranged schedule of classifications which is not in any way limited by the numerical values of the pockets or of the values of the classification designations but is limited only by the number of pockets available and the number of classifications. As an illustration, with reference to the specific problem outlined above, records having any one of the classifications 0 to 6, inclusive, representing petroleum products, can be placed together in any selected pocket bearing no relation numerically to any of the classification numbers. Similarly, records having any one of the remaining group of classifications, can be deposited in some other pocket.

Another object of the invention is to provide improved sorting blade operating mechanism which not only operates positively in respect to not only the special selecting and sorting operation mentioned above to be performed, but also permits normal sorting operations to be performed.

A further object is to provide sorting blade operating mechanism which is flexible and not dependent on the numerical values of the holes in the records, but is capable of controlling the sorting of records according to the desire of the operator.

Other objects, advantages, and features of the invention will be specifically pointed out in the following description and claims, or will be apparent from a study of the description claims and drawings.

Figure 1:
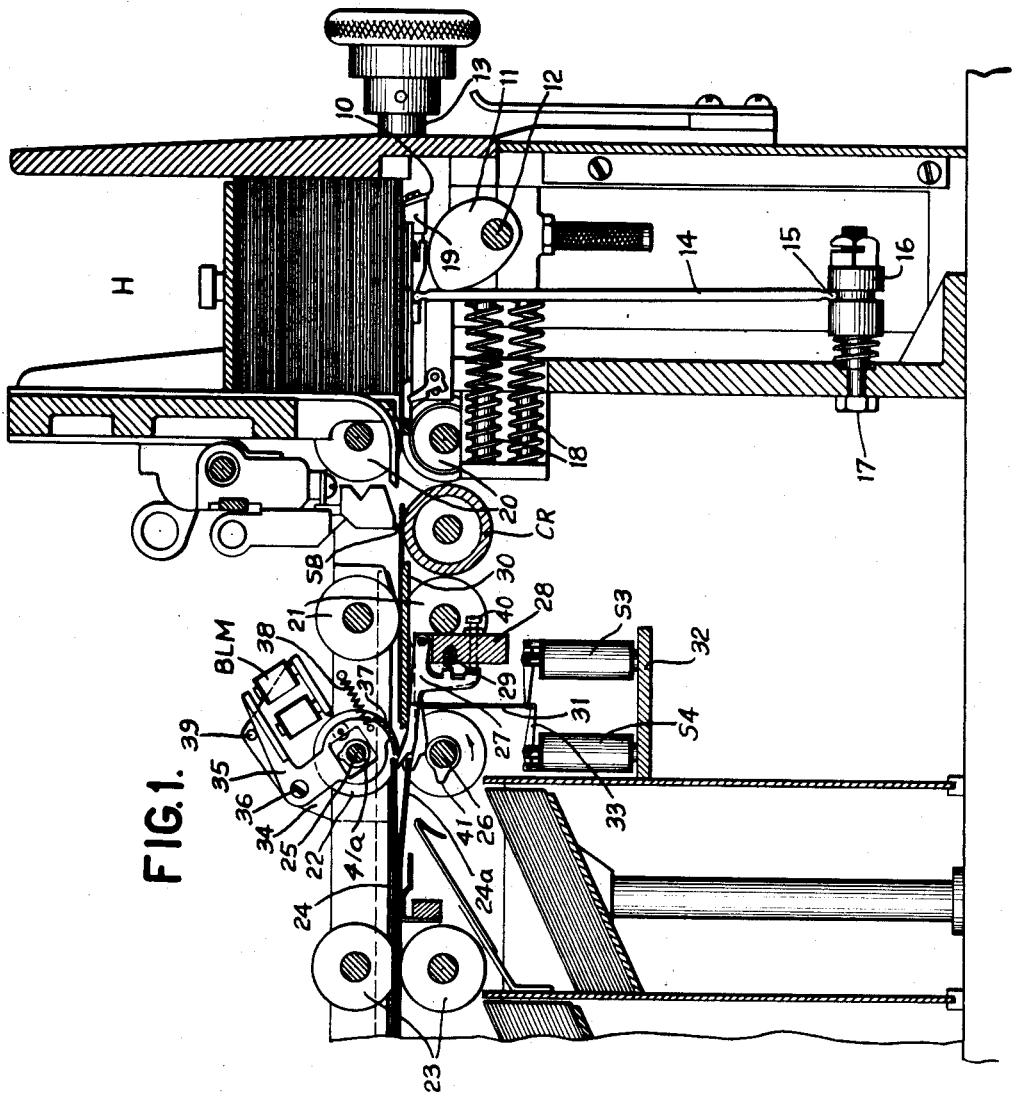
Fig. 1 is a vertical longitudinal section of part of a sorting machine constructed in accordance with the present invention.

The invention is shown applied to an "International" electric sorting machine in which the distribution of the record cards to the various pockets is effected by means of a group of thin, flexible sorting blades, each leading to a pocket, there being twelve pockets for the reception of cards having holes in a column sensed by the usual sorting brush and a thirteenth, or reject pocket, for those cards that do not have a hole in the given column. Various methods of operating these blades have been employed, the most common method being to selectively operate all the blades by means of a single magnet as in Patent No. 1,741,985.

The present invention contemplates operating the blades by means of a series of blade operating solenoids and a blade lifting magnet working in cooperation with the solenoids. The mechanism is shown in Fig. 1 which is a vertical section through the right-hand end of the sorting machine and shows only the card hopper, card sensing brush, part of the card feed mechanism, the blade operating mechanism, and one of the card pockets.

The card hopper, card sensing mechanism, and card feeding-mechanism are substantially the same as in Patent Nos. 1,880,428 and 1,969,362, granted to E. A. Ford, consequently only a very general description will be given herein. The card hopper is generally designated H in Fig. 1 and has the usual card picker 10 actuated by cam 11 on shaft 12 which is driven by the main shaft 13 through suitable gearing not shown. Cam 11 actuates the picker 10 by means of a plate 14 fulcrumed at 15 in a groove formed in a suitable adjustable sleeve 16 carried by a fixed stud 17. Springs 18 hold the plate 14 in engagement with the cam 11. Plate 14 works in a slot in the slidable picker support 19 whereby the rocking movements of plate 14 caused by cam 11 produce a reciprocatory movement of the picker 10. This causes the cards in the hopper to be successively ejected from the hopper far enough to be gripped by a pair of feed rollers 20 driven by the main shaft 13.

The rollers 20 feed the cards past the sorting brush SB which is mounted as in Patent No. 1,741,992 granted to Harry Kleckler which discloses mechanism for manually setting the sorting brush SB to sense any desired column of the cards. Further pairs of feed rollers designated 21, 22, 23 convey the cards from the sorting brush SB to the proper pocket. The feed rollers 21, 22, 23, as well as the feed rollers 20, are driven in unison by shaft 13 through suitable gearing not shown. The usual contact roller CR is provided to cooperate with sorting brush SB, and is connected to the circuits of the machine by means of the usual contact roller common brush CB shown in Figs. 2 and 3. The contact roller CR is of the same diameter as the feed rollers and is driven in unison therewith by shaft 13 through gearing not shown.

There are twelve sorting blades which are generally designated 24 in Fig. 1. These blades are of the same width between the points where they are anchored at their respective pocket and a point adjacent feed rollers 23. The blades are mounted in superposed relation and are progressively shorter in length ranging from top to bottom, the longest blade reaching to the pocket next to the extreme left-hand pocket while the shortest blade reaches only to the extreme right-hand pocket.

Figure 2:
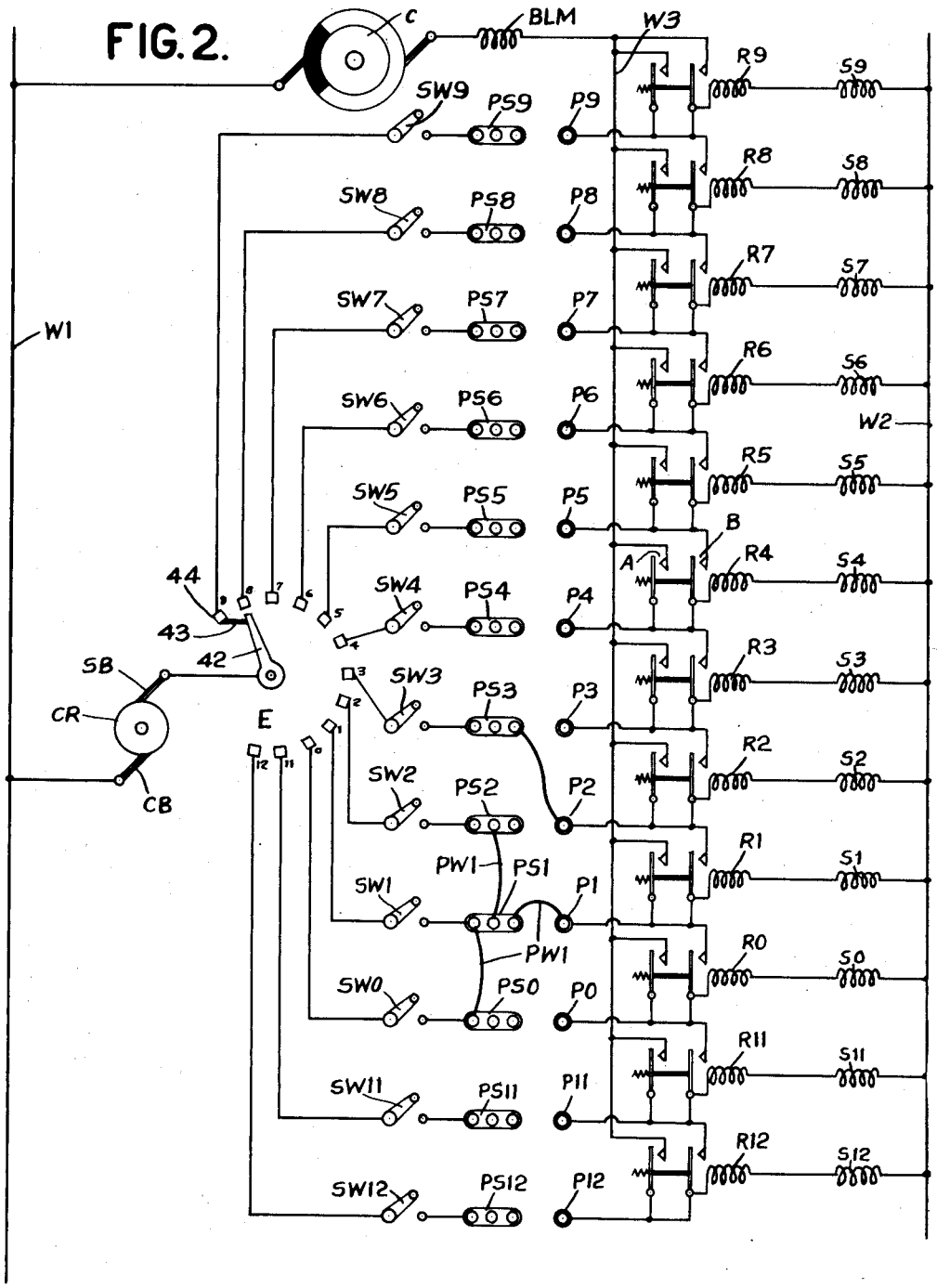
Fig. 2 is a wiring diagram showing one system for wiring the machine.

When the machine is wired as in Fig. 2, if a card lacks a hole in the column sensed by the sorting brush SB, none of the sorting blades will be operated and the card will pass beneath all of them and enter the extreme right-hand pocket. Thus the latter pocket will be the reject pocket and the one next to it the "9" pocket, with the numerical values of the pockets ranging from right to left as follows: "9", "8", "7", * * * "0", "11", "12". The sorting blades 24 are valued in the same order from the lowermost to the topmost blades.

Figure 3:
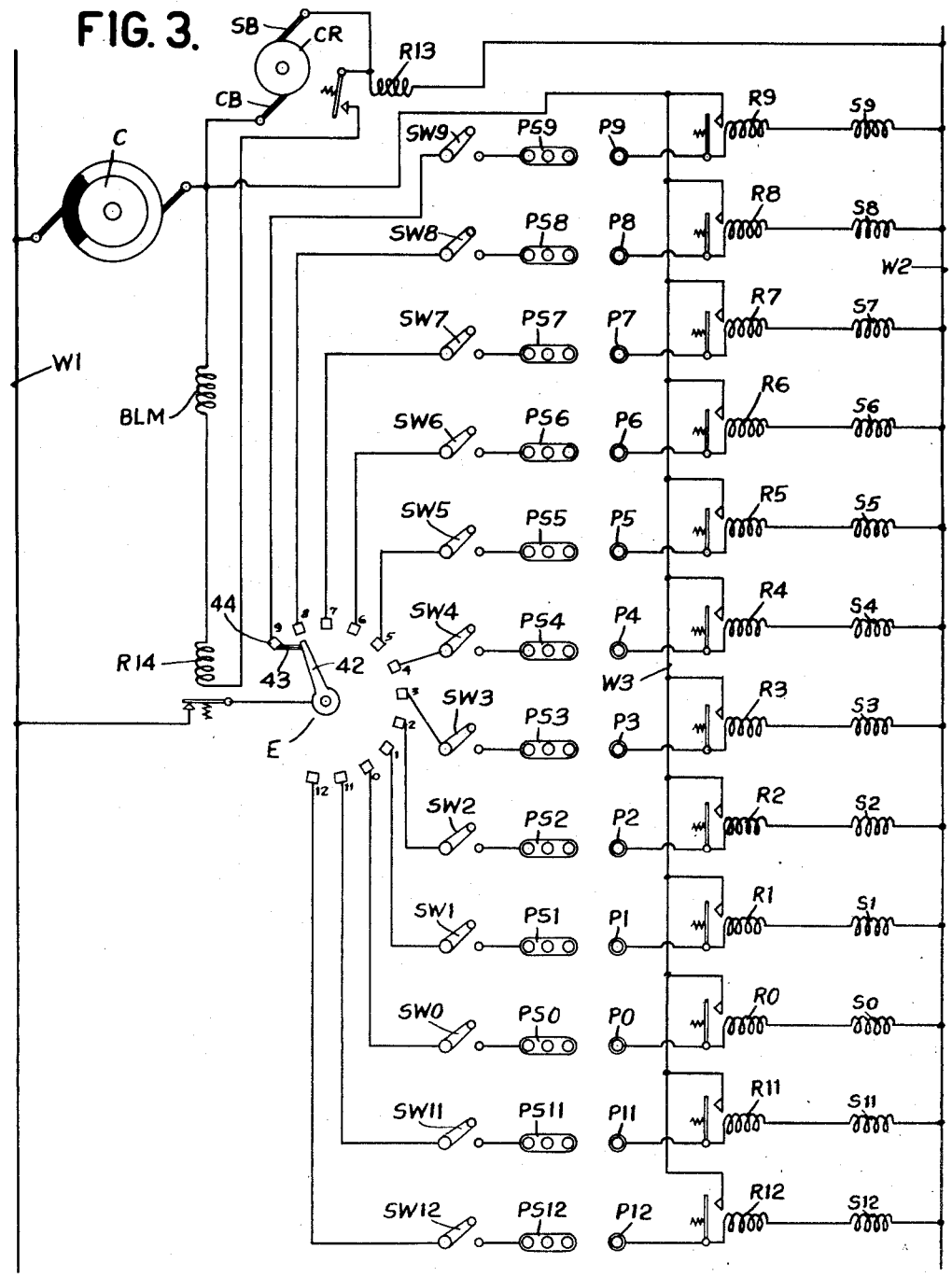
Fig. 3 is a diagram showing an alternative system for wiring the machine.

With the machine wired as in Fig. 3 all the blades will be operated when a card locking a hole in the column sensed by brush SB occurs and such card will be conveyed to the extreme left-hand pocket which thus becomes the reject pocket while the extreme right-hand pocket becomes the "9" pocket. The order of arrangement of the pockets and blades is the same save for the transposition of the reject pocket. The reason for this difference in the arrangement of the pockets will be made clear hereinafter.

The sorting blades taper to narrow tongues 24a from a point between the shafts carrying feed rollers 23 to a point between the shafts 25, 26 carrying the upper and lower feed rollers 22, respectively. The tongues 24a are less than one-twelfth of the width of the untapered parts of the blades and are so shaped that the tongues lie side by side in a horizontal straight row at right angles to the line of feed of the cards and parallel with the planes of the cards as the latter pass the ends of the tongues.

Each tongue rests on one of twelve blade operating arms 27 pivoted in slots in a bar 28 mounted in the framework. The blade operating arms 27 are operated by springs 29 which press the arms against a plate 30 over which the cards pass and the arms 27 are so shaped that the tongues 24a are held above the line of feed of the cards. This permits the cards to pass beneath as many of the tongues as may be held up by the arms 27 and over said arms. Normally all the blades 24 are held above the line of feed and, with the wiring as in Fig. 2, if a card does not have a hole in the column sensed by brush SB, such card will pass underneath all the tongues 24a and over all the arms 27 and will be deposited in the reject pocket.

The blades 24 are allowed to drop under control of the holes sensed by the sorting brush SB and for this purpose there is provided a group of solenoid assemblies designated S9, S8, * * * S0, S11, S12 to correspond with the index-point positions of the column sensed by the sorting brush. Each solenoid assembly is associated with one of the blades 24 and for the purpose of controlling the blade is connected to the corresponding arm 27 by means of a link 31. Only the middle pair of solenoids designated S3, S4, are shown in Fig. 1, the solenoids being secured in two rows on a fixed plate 32 and staggered in respect to the plunger operated levers 33 to which links 31 are connected. It is apparent that if any selected solenoid, say the one designated S4, is energized, the arm 27 associated with the "4" blade 24 will be drawn downwardly eventually allowing the tongue 24a of the "4" blade to drop below the line of feed of the cards. Due to the method of wiring the control relays in Fig. 2, all the solenoids associated with the blades below the selected one will also be energized, causing in effect the physical separating of the entire group of blades 24 into two separate groups, with the blades of one group above, and those of the other group below, the line of feed of the cards. This operation of splitting the blades into two groups is controlled by the holes in the cards and will be explained more fully hereinafter as it is not effected in the same fashion in the two different forms of wiring shown in Figs. 2 and 3. At present it will be assumed that the solenoid S4 has been energized causing the solenoids S5 to S9 to be energized and allowing the tongues 24a of the six lowermost blades 24 corresponding to the index-point positions "5" to "9", inclusive, to drop.

After the above group of blades has dropped, means is provided to raise the remaining blades slightly above the card having the hole which caused the solenoid S4 to be energized. This card will now be in the "4" position with the wiring of the machine as shown in Fig. 2. The blade lifting means is also controlled by the hole in the card through a blade lifting magnet BLM mounted on one of a pair of plates 34 secured to the front and rear frame plates in which the feed rollers are mounted. Magnet BLM actuates a blade lifting bail comprising side arms like 35 pivoted to plates 34 by means of studs 36, and a plate 37 which is curved in transverse section. Springs like 38 hold the arms 35 against stop pins 39 carried by plates 34.

The left-hand edge of the curved plate 37 is beveled and when arms 35 are held by springs 38 against stop pins 39, the beveled edge is slightly to the right of the ends of the blades 24 and also a little above the line of feed of the cards. Preferably the ends of blades 24 are bent slightly upwardly to permit the beveled edge of plate 37 to slip under the ends of those blades which were not drawn downwardly by the energized solenoids S0, S1, etc. and raise the blades well above the line of feed of the cards. Thus a wide passage for the card is provided and none of the relatively narrow tongues 24a in the blades bears on the card. The tongues 24a in the blades 24 have a spring tension downwardly which is exerted on the arms 27 whereby the tongues follow the movements of said arms. These movements are limited by stop screws 40 carried by the bar 28. A row of cams like 41, mounted on shaft 26, become operative to start the arms 27 toward normal position in the event they stick after the holding circuits for solenoids S0, S1, etc. are broken. A pair of cams 41a on shaft 25 cooperate with rollers carried by arms 35 at the proper time to ensure release of the armature of magnet BLM.

With reference to Fig. 2, each of the solenoids S0, S1, S2, etc. is connected in series with brush relays designated R0, R1, R2, etc. between the left-hand line wire W2, and plug sockets designated P0, P1, P2, etc. E generally designates an emitter consisting of a rotary arm 42 carrying a brush 43 adapted to wipe over segments 44. The emitter E is driven by the main shaft 13 by suitable gearing not shown so as to operate in synchronism with the feeding of the card past the sorting brush SB. In other words, when the brush SB reaches the "9" index point position, the emitter brush 43 will move onto the "9" segment 44, and similarly for the other index-point positions. Each of the segments 44 is connected to a triple plug socket through a switch, these switches and plug sockets being designated PS0, PS1, PS2, etc. and SW0, SW1, SW2, etc., respectively, to correspond with the numbering of the solenoids and brush relays. C designates a holding commutator very similar to the commutators provided in present types of commercial sorting machines.

The operation of the machine for normal sorting, that is, the simple distribution of records to the pockets in accordance with the numerical values of perforations in one column will first be described in order to explain the operation of the machine as a whole.

The switches SW0 to SW9, SW11, SW12 are all closed for the normal sorting operation and plug wires are inserted between the correspondingly numbered sockets P0, PS0, etc. whereby in effect each blade operating solenoid and its corresponding brush relay is connected to the correspondingly numbered segment 44 of the emitter E.

It will be assumed that a hole appears in the "4" position of the column of a card sensed by the brush SB. Due to the fact that brush SB is insulated by the card from the "9" point in the cycle to the "5" point in the cycle, no circuits can be established through the relays R5 to R9 and solenoids S5 to S9, respectively. When the brush 44 reaches the "4" segment 44, a circuit is established through the "4" hole in the card as follows: line wire W1, common brush CB, contact roller CR, sorting brush SB; the arm 42, brush 43 and "4" segment 44 of the emitter E; switch SW4, plug socket PS4, the plug wire, the plug wire socket P4, the relay R4, and solenoid S4, to the line wire W2. The energization of relay R4 closes its contacts A to establish a holding circuit for the relay R4 and solenoid S4 as follows: line wire W1, the commutator C, the blade lifting magnet BLM, wire W3, contacts A of relay R4, the coils of relay R4 and solenoid S4 to line wire W2. At the same time, contacts B close and have the effect of energizing relay R5 and solenoid S5 by a branch circuit from line wire W3 through the contacts A and B of relay R4, and the coils of relay R5 and the solenoid S5, to line wire W2. In a similar fashion, the contacts of relay R5 energize the relay R6 and so on for the relays R7, R8, and R9. Thus, when a "4" hole is sensed, the relays R4 and R9 and the solenoids S4 to S9 are all energized along with the blade lifting magnet BLM. This causes the blades operated by the solenoids S4 to S9 to be drawn downwardly and at the same time the magnet BLM operates the bail 37 to lift the remaining blades well above the line of travel of the card containing a "4" hole.

Since it is desirable that all the solenoids S4 to S9 be energized before bail 37 is operative to avoid overloading solenoid S4, it is preferable that the magnet BLM be rather sluggish in its action for which purpose it may be slowed down if necessary by any well known means such as a dash pot, to name a mechanical means, or copper rings, to cite an electrical means of retarding its operation. As a result, a passageway is opened for the card having a "4" hole whereby such cord will be ultimately conveyed to the "4" pocket between the blades associated with the "4" and "3" pockets, respectively. Commutator C holds the circuit for an appreciable time after the card has passed between the "3" and "4" blades before it breaks the holding circuits for the relays R4 to R9 and solenoids S4 to S9.

When it is desired to limit normal sorting operations to selecting and sorting predetermined cards, switches SW0, SW1, etc. may be opened to cause rejection of the undesired cards. It may be desired, for example, to sort only the cards designated "6", "11", and "12". This is accomplished by opening all of the switches except SW6, SW11, SW12 causing cards designated "6", "11", and "12" to be distributed to the correspondingly numbered pockets while all others will be rejected.

It is manifest from Fig. 2 that with this circuit arrangement, it is possible to operate any desired solenoid under the control of a hole in any index point position. It is possible, therefore, to cause the cards to be distributed to the pockets arbitrarily without regard to the values of either the holes or the pockets. This may be illustrated with reference to the classification table given above.

It will be assumed that with the cards representing sales of gasoline, oil, grease or other products commonly sold by oil companies arranged on a territorial basis are to be sorted so that separate reports, each on a territorial basis, of the various groups of products may be obtained. If a separate report were desired for gasoline, the classifications of which are designated by means of holes in the "0, 1, and 2" positions, all cards having holes in these positions can be deposited in any desired pocket, say the "1" pocket. In order to accomplish this result, the plug sockets PS0, PS1, PS2, may be interconnected with plug socket P1, as in Fig. 2, by means of plug wires PW1, and the switches SW0, SW1, SW2 closed. Similarly, the cards for the remaining groups of products may be distributed to the pockets 2 to 7 by plugging the machine according to the following table.

Table II

| Group | Class | Product | Plugging | Pocket |
|---|---|---|---|---|
| I | 0 | Gasoline—Grade 1 | P1 to PW0 | 1 |
|  | 1 | Gasoline—Grade 2 | P1 to PW1 | 1 |
|  | 2 | Gasoline—Grade 3 | P1 to PW2 | 1 |
| II | 3 | Oil | P2 to PW3 | 2 |
| III | 4 | Grease | P3 to PW4 | 3 |
| IV | 5 | Kerosene | P4 to PW5 | 4 |
|  | 6 | Naphtha | P4 to PW6 | 4 |
| V | 7 | Tires | P5 to PW7 | 5 |
|  | 8 | Chains | P5 to PW8 | 5 |
| VI | 9 | Batteries | P6 to PW9 | 6 |
|  | 11 | Misc. accessories | P6 to PW11 | 6 |
| VII | 12 | Service | P7 to PW12 | 7 |

Switches SW0 to SW9, SW11, and SW12 are closed for this operation. In order to avoid confusion, only the plug wire connections for the first two groups of Table II have been shown in Fig. 2.

When the cards are fed through the machine they will occur in order by territorial code number and obviously will be deposited in the pockets in the same order. Whenever a card bears one of the classifications 0, 1, or 2, it will have the effect of energizing the relay R1 and the solenoid S1 irrespective of whether the hole occurs in the "0", "1", or "2" positions, therefore, any card bearing one of these classifications will become deposited eventually in the "1" pocket. Cards designated "3" to "9", "11", and "12" will be distributed to the pockets as shown by Table II. In the event that a card does not have a hole in the column sensed by the brush SB, none of the relays or solenoids will be energized and this card will pass underneath all the blades and eventually drop in the reject pocket.

Fig. 3 shows a modification in which the operation is reversed, that is, the solenoids are normally energized and means is provided to interrupt the energization of the solenoids at the point in the cycle corresponding to the value of the hole sensed by the brush SB. In Fig. 3 a single brush relay R13 is provided in addition to the relays R0 to R9, R11, and R12 which in this case are not energized by a circuit through the sorting brush but serve merely as holding relays. A relay R14 is arranged to interrupt circuits through the emitter E whenever a hole is sensed in the card. The machine is plugged and the switches SW0 to SW9, SW11, SW12 are set in the same way as described above for the wiring shown in Fig. 2.

In the case of normal sorting operations, with each plug socket PS0, PS1, PS2, etc. plugged to the plug sockets P0, P1, P2, etc. and switches SW0, SW1, SW2, etc. closed, circuits are established in succession through the solenoids S9, S8, S7, etc. as the brush SB traverses the index-point positions 9, 8, 7, etc. Thus the blades 24 are successively drawn downwardly until a hole is sensed in the card. Let it be assumed that a "4" hole is sensed by the brush SB. This establishes a circuit as follows: line wire W1, commutator C, common brush CB, contact roller CR, brush SB, and brush relay R13, to line wire W2. Relay R13 closes its contacts and thereby energizes magnet BLM and relay R14 by connecting the relays R13, R14 and magnet BLM in series between the commutator C and the line wire W2. Relay R14 opens its contacts to interrupt the circuit for the emitter E thereby preventing energization of the solenoids S0 to S4, S11, S12.

The blades associated with the solenoids S5 to S9 are drawn downwardly before the "4" hole is sensed by brush SB. Since energization of the solenoids S0 to S4, S11, and S12 is prevented, the card having the "4" hole will pass between the "4" and "5" blades and will be deposited in the "4" pocket. In order to ensure that the solenoid S4 will not be energized, it may be necessary to time emitter E so it lags behind the sorting brush SB to enable the latter to energize relays R13, R14 before brush 43 can complete a circuit through relay R4 and solenoid S4.

The principal advantage of the present invention is its flexibility which permits distributing the record cards to the pockets according to any desired order or group limited only by the number of pockets and by the number of index-point positions. Thus any pocket may be arbitrarily assigned to receiving all records having any one of a predetermined group of designations. Prior commercial sorting machines, being dependent upon mechanisms having a fixed and invariable timing, or upon a definite time relationship between the position of a designation in the record and the mechanism controlled by such designation. In present "International" electric sorting machines, the sorting mechanism is controlled by a single magnet and the records must be distributed to the pocket corresponding to such designation or rejected. It is possible, by means of special devices, to vary this to the extent of causing all records to be distributed to one of two pockets, but these special devices, in their turn, have a fixed and invariable effect in distributing the records and they are inflexible.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a sorting machine, a series of sorting pockets, a sorting station and a series of guide blades leading from the sorting station to the pockets, solenoids located at the sorting station and having individual connections to the sorting blades whereby each solenoid actuates one of said blades, means to normally progressively energize the solenoids, a sorting brush for sensing designations in a column of a record, and means controlled by the sorting brush for interrupting the energization of the solenoids in accordance with the value of a designation sensed by the brush.

2. In a sorting machine, a series of sorting blades, means individual to each blade for moving it in a direction to open a passage for a record, a record sensing brush, means controlled by the record sensing brush for causing the blade operating means to operate in accordance with designations in a record sensed by said brush, and means controlled by said brush for causing the remaining blades to move in the opposite direction whereby to enlarge the passage created for the record sensed by said brush.

3. In a sorting machine, a series of sorting blades, a record sensing brush, means individual to said blades for operating blades in one direction, means controlled by said brush for causing a predetermined number of said blades to be operated by the individual operating means in accordance with a designation sensed by said brush, and means controlled by said brush for causing the remaining blades to move in the opposite direction whereby to open a passage for the record having the designation.

4. In a sorting machine, a series of sorting blades, a series of sorting circuits, each including a solenoid for operating one of said blades in one direction, means to cause impulses of current to be delivered to said circuits in succession, a record sensing brush, means controlled by said brush for controlling the impulses emitted by the impulse means whereby a predetermined number of the solenoids are energized to correspond with the value of a designation sensed by said brush, and means controlled by said brush for causing the unoperated blades to move in a direction opposite of that of the operated blades whereby to open a passage for the record having the designation, including a blade lifting device common to all the bades and a magnet for operating said device.

5. In a sorting machine, a series of sorting blades, a record sensing device for sensing designations, means individual to said blades for operating the blades in one direction, means controlled by said sensing device for causing a predetermined number of blades to be operated by the individual operating means in accordance with said designations, and means controlled by the sensing device for causing the remaining blades to move in the opposite direction whereby to open a passage for the record having the designation.

6. In a sorting machine, a series of sorting blades, means individual to each blade for moving it in a direction to open a passage for the record, a record sensing device, means controlled by the record sensing device for causing the blade operating means to operate in accordance with designations in a record sensed by said device, and means controlled by said device for causing the remaining blades to move in the opposite direction whereby to enlarge the passage created for the record sensed by said brush.

7. In a sorting machine, a series of sorting blades, a series of devices for operating the blades in one direction, a record sensing element, means controlled by the record sensing element for controlling the number of blade operating devices which are operative; and means controlled by the sensing element for causing the remaining blades to move in a direction opposite to that of the operated blades whereby to open a passage for the record having the designation, including a blade lifting member common to all of the blades and means to actuate said member.

8. In a sorting machine, a plurality of sorting guides, a plurality of operating devices for said guides, each device being independent of the others and associated with only one of said guides, a single record sensing element, a switching device for progressively rendering the guide operating devices effective in succession, controlling means for the switching device controlled by the sensing element, and including manually settable means for causing the switching device to bring about the operation of a predetermined number of the guide operating devices upon the sensing of a predetermined designation, said settable means being adapted to arbitrarily control the effect of the switching device irrespective of the value of the designation.

9. In a sorting machine, a series of sorting guides, a series of solenoids each having a direct connection to one of said guides whereby each solenoid actuates one of the guides, means to successively energize the solenoids in a predetermined order, a single record sensing brush for sensing designations in a column of a record, and means controlled by said brush for interrupting the energization of said solenoids according to the position of a designation in said column.

10. In a sorting machine, a series of sorting blades; a series of solenoids for actuating the blades to open a passage for a record, each solenoid directly actuating a single blade; a single record sensing brush for traversing a record column containing a single designation disposed in one of a plurality of index-point positions each of which positions represents a value different from the others; circuits for said solenoids, a device controlled by the brush for closing said circuits according to the position of a designation in the column sensed, said device causing a group of said solenoids to be energized together to open the passage for the record, and manually settable switching means for controlling the number of designations affecting a given group of said solenoids, said switching means being presettable to couple said circuits to the circuit closing device whereby to cause a predetermined group of said solenoids to be energized when the brush senses any one of a predetermined number of designations as determined by the setting of the switching means.

EMERSON W. GIFFORD.